United States Patent [19]

Purohit et al.

[11] Patent Number: 5,249,390
[45] Date of Patent: Oct. 5, 1993

[54] PLANT SUPPORT TRELLIS APPARATUS

[75] Inventors: Ankur Purohit, Darien; James Kotora, Jr., La Grange Park, both of Ill.

[73] Assignee: Anshal, Inc., Darien, Ill.

[21] Appl. No.: 743,172

[22] Filed: Aug. 9, 1991

[51] Int. Cl.⁵ .......................................... A01G 17/06
[52] U.S. Cl. ......................................... 47/45; 47/70
[58] Field of Search ................... 47/45, 47, 44, 70; 248/156

[56] References Cited

U.S. PATENT DOCUMENTS

| 604,260 | 5/1898 | Parker | 47/47 |
| 1,218,115 | 3/1917 | Phillipps | 47/47 |
| 1,932,790 | 10/1933 | Lein | 47/47 |

FOREIGN PATENT DOCUMENTS

| 51532 | 4/1936 | Denmark | 47/47 |
| 2739414 | 2/1979 | Fed. Rep. of Germany | 47/45 |

Primary Examiner—Henry E. Raduazo
Attorney, Agent, or Firm—Charles F. Lind

[57] ABSTRACT

The disclosed trellis apparatus is assemblied from a number of separate substantially identical rigid L-shaped pieces, each having short and long generally straight portions meeting across a generally right angle bend, and a loop formed adjacent the free end of each portion. The loop on the short portion is open and presents a gap wider than the cross-section of the long portion and further lies in a plane generally perpendicular to the straight portion. The free end of each long portion may be inserted direct)y into the plant dirt, at different circumferential locations radially adjacent the plant, to a depth that provides stable support thereof and that orients the short portion substantially horizontal and laterally adjacent the plant foliage. The open loop on each short portion can be interlocked with the long portion of the adjacent piece at or near its bend, to laterally secure the pieces together, thereby forming a closed containment ring surrounding the plant at a desired height above the dirt for containing the plant foliage. The loop on the long portion holds the piece firmly within the dirt and blunts the otherwise pointed end for saftey.

3 Claims, 3 Drawing Sheets

PLANT SUPPORT TRELLIS APPARATUS

BACKGROUND OF THE INVENTION

Plants flourish in potted confinment, frequently to the extent that their foliage of vines, blossoms and leaves exceeds the lateral size of the pot and spread out excessively. To avoid the need for constant pruning as well as to add height to the plant, trellis means are common for supporting such plant foliage and for redirecting the growth upwardly. While different types are available, the most popular trellis apparatus have one or more of the features, including being easily and reliably used, versatile for different sizes of plants, attractive, economical to make, and preferably compact for easy marketing and storage.

SUMMARY OF THE INVENTION

This invention provides a multiple piece trellis apparatus, that can be assemblied as needed around the plant to support the plant with good stability.

An important feature of this invention is its simplicity, using three or more like separate generally two dimensional component pieces to define a sturdy three-dimensional trellis apparatus suited for surrounding and containing the plant.

Another important feature of this invention is the ease of interlocking the separate component pieces relative to one another, with possible variations for adjusting to fit around different size plants.

Yet another feature of this invention is the ease and economy of fabrication of the separate component pieces, and their compactness, to allow for the economical manufacturing and marketing of the trellis apparatus.

To provide and achieve these and other features and advantages, the present invention consists of a trellis apparatus formed of separate substantially identical generally L-shaped rigid pieces each having short and long generally straight elongated portions meeting across a generally right angle bend, and having loop means defined adjacent the free end of the short portion. To set-up the trellis apparatus, the loop means on one piece can be interfitted near the bend onto the long portion of an adjacent piece, to define when all pieces are interfitted and when the free end of each long portion is inserted directly into the plant-carrying dirt a stable closed three-dimensional containment ring surrounding the plant. Loop means can also be formed on the free end of the long portion for improving stability of the piece supported within the dirt and for saftey.

BRIEF DISCRIPTION OF THE DRAWINGS

These and other features, advantages and objects of the present invention will appear from the following disclosure and description, including as a part thereof the accompanying drawing, in which.

DETAILED DESCRIPTION OF AN ILLUSTRATED EMBODIMENT

Figure 1:
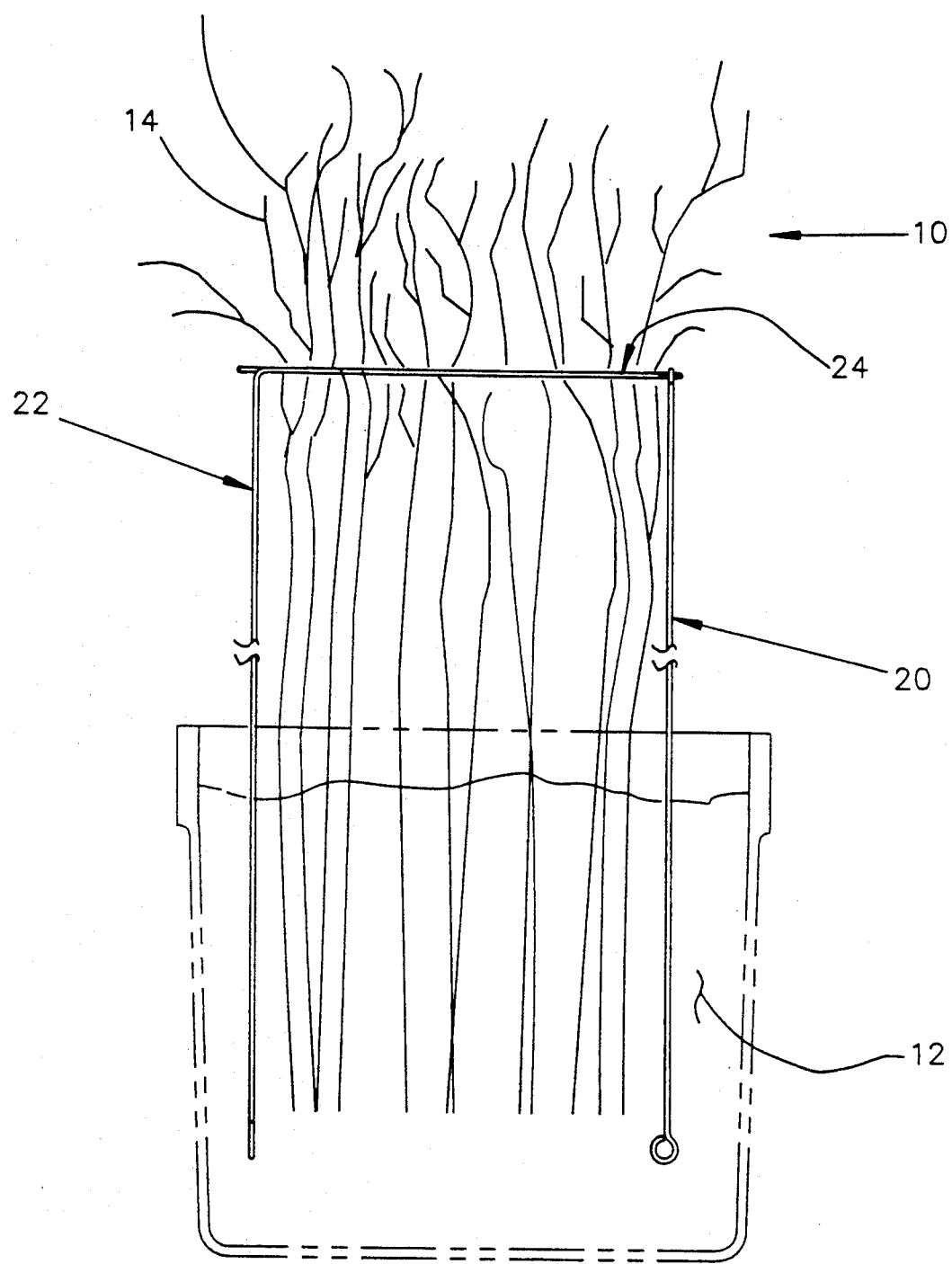
FIG. 1 is an elevational view of a typical plant, with its foliage contained within a trellis apparatus formed according to this invention.

FIG. 1 illustrates a plant 10 growing in dirt 12, and having foliage 14 overlying the dirt and laterally contained within trellis apparatus 20. The trellis apparatus 20 has substantially vertical legs 22 and a substantially horizontal containing ring 24 supported on the legs laterally adjacent the plant foliage 14 at a desired height above the dirt 12.

Figure 2:
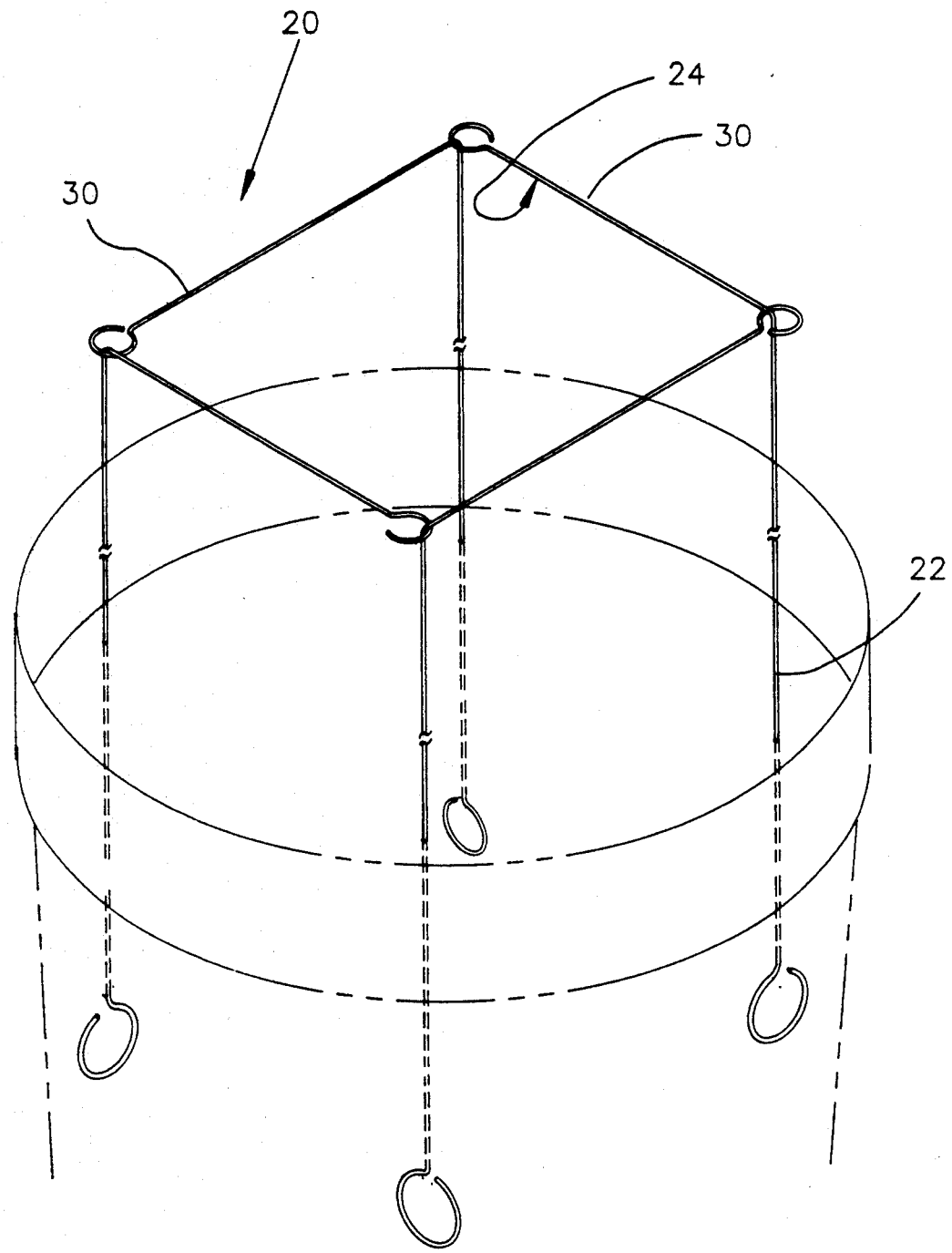
FIG. 2 is an enlarged perspective view of the trellis apparatus of FIG. 1, except showing it without the plant for clarity of disclosure.
Figures 3, 4:
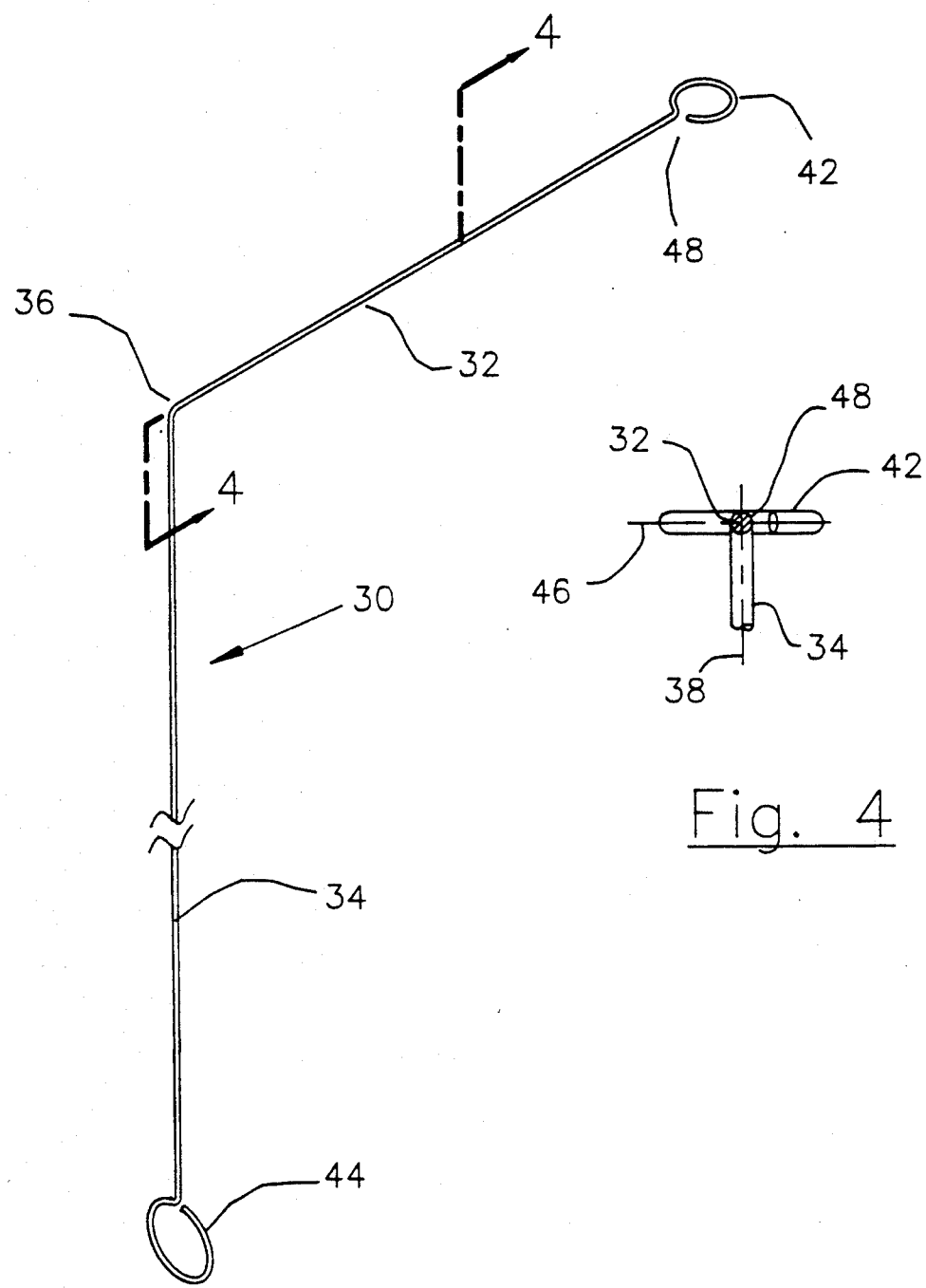
FIG. 3 is an enlarged exploded prespective view of one component piece used in forming the trellis apparatus of the previous figures.
FIG. 4 is a fragmentary section, taken generally along line 4—4 in FIG. 2.

The trellis apparatus 20 is actually made up of a plurality of separate component pieces 30 (FIGS. 2 and 3), each of substantially identical generally rigid construction.

Each trellis component piece 30 is somewhat L-shaped, having generally straight elongated portions 32 and 34 meeting across a generally right angle bend 36. The illustrated straight portion 32 is much shorter than the straight portion 34. The two angled portions 32 and 34 together define a single two-dimensional plane (38 in FIG. 4).

Loops 42 and 44 are defined adjacent the free ends of the respective straight portions 32 and 34, each spaced from the intermediate bend 36.

The loop 42 illustrated on the short portion 32 defines a plane 46 generally perpendicular to the plane 38 of the straight portions 32 and 34. The loop 42 is curved over an angle less than a complete circle, to leave a gap 48 wider than the cross-section of the long straight portion 34 particularly near the bend 36. Thus, the loop 42 of one trellis piece may be fitted over the long straight portion 34 of another trellis piece at or near its bend 36, to laterally secure the pieces 30 together.

The long portion 34 of each separate trellis piece 30 can be inserted into the dirt at different circumferential orientations around and adjacent the foliage 14 of the plant 10, and the loop 42 at the gap 48, can be fitted over and interlocked onto the long portion 34 of the adjacent trellis piece at or near its bend 36.

The interconnected short portions 32 of the trellis pieces 30 form the closed containment ring 24 surrounding the plant.

Sufficient penetration of the long portions 34 into the dirt provides stable support of the pieces 30, and horizontal orientation of the short portion 32 at a desired height above the dirt 12 and laterally adjacent the plant foliage 14.

Once the loop 42 of one trellis piece 30 has been fitted onto the adjacent trellis piece, the gap 48 can be manually closed if desired by deforming the loop slightly with pliers or a like tool, to prevent the component pieces from accidentially becoming separated.

The illustrated loop 44 projects laterally beyond the adjacent edges of the long straight portion 34, to improve the hold and stability of the long portion when inserted into the dirt. The loop 44 also blunts the otherwise pointed free end for saftey reasons. The loop 44 can be curved over a complete circle with no appreciable end clearance gap, or can be curved over less than a complete circle to leave a gap.

The illustrated short portion 32 may be approximately between 2 and 6 inches long, while the long portion 34 may be approximately between 10-40 inch long. The long portion 34 may be inserted directly into the dirt to a depth that provides stable support of the piece and that aligns the short portion 32 horizontally at a desired height above the dirt and laterally adjacent the plant.

The inserted long portions 34 can be oriented vertically, or angled radially inward or outward of the plant; but preferably at similar angles for aesthetic balance.

The disclosed trellis apparatus 20 uses four separate interlocked rigid pieces 30, arranged generally 90 degrees apart. At least three pieces 30 must normally be used, arranged generally 120 degrees apart, to form a three dimensional trellis apparatus; but five, six or even more pieces 30 can be used for providing versatile adjustment around different circumferentially sized plants.

Moreover, as the component pieces 30 are generally planar, a kit comprised of a number of like pieces 30 can be compactly nested together for economical marketing of the disclosed trellis apparatus.

The trellis pieces 30 can be economically fabricated, such as of a circular cross-section galvanized steel wire (possibly between ⅛-¼ inch OD). The wire can be cut and shaped in a conventional four-slide former (not shown), such as by initially straightening the wire, by then coiling the end loop 42 and 44 in the same plane and with the end gaps on the same side of the wire, and by then bending the short portion 32 over approximately a right angle about the bend 36. With this procedure, the loops 42 and 44 will end up in substantially perpendicular planes, and loop 44 would lie generally perpendicular to the plane 38 of the straight portions 32 and 34.

The loops 42 and 44 may be small, approximately between ⅜ and 1 & ½ inch OD.

If desired, the wire pieces 30 can be coated with a plastic or other finish, for decorative and/or durability purposes; or alternatively can be made of a rigid durable plastic material, instead of metal.

While only a single embodiment of the invention has been illustrated, it is apparent that variations may be made therefrom without departing from the inventive concept. Accordingly, the invention is to be limited only by the scope of the following claims.

What is claimed as our invention is:

1. Trellis apparatus for containing plant foliage, comprising the combination of a plurality of separate substantially identical rigid L-shaped wire pieces, each a circular cross-section of the order of ⅛-¼ inch OD;

each wire piece having short and long generally straight portions meeting across a generally right angle bend, defining thereby a single plane;

each straight portion, from an interior location spaced from the bend, being curved over approximately a complete circle to direct the free end of the wire at a sharp angle transverse to the wire at the interior location and to position it in adjacent closely spaced proximity thereto, for defining a substantially closed loop and for the making the free wire end interiorly inaccesible for safety reasons;

the free end of the wire on the short portion being spaced slightly from the wire at the interior location for defining a gap just wider than the wire cross-section, to allow the short portion loop of one piece to be fitted over and be interlocked with the long portion of another piece at or near its bend, to laterally secure the pieces together;

the free end of the wire on the long portion being closely adjacent the wire at the interior location for defining a minimal gap;

whereby the free end of each long portion may be inserted directly into the plant dirt at different circumferential orientations radially adjacent the plant to a depth that provides stable support thereof and that orients the short portion substantially horizontal and laterally adjacent the plant foliage, and the short portion loops of the separate pieces can be interlocked onto the adjacent piece to form with the interlocked short portions a closed three-dimensional containment ring surrounding the plant at a desired height above the dirt.

2. Trellis apparatus according to claim 1, further comprising each loop being between ⅜ and 1 & ½ inch OD.

3. Trellis apparatus according to claim 1, further comprising the short portion being between 2 and 6 inches long and the long portion being between 10 and 40 inches long.

* * * * *